INVENTORS
Andrew Kalitinsky
Carl R. Soderberg

Dec. 5, 1950 A. KALITINSKY ET AL 2,532,721
COOLING TURBINE ROTOR
Filed Aug. 23, 1944 3 Sheets-Sheet 3

INVENTORS
Andrew Kalitinsky
Carl R. Soderberg

Patented Dec. 5, 1950

2,532,721

UNITED STATES PATENT OFFICE 2,532,721

COOLING TURBINE ROTOR

Andrew Kalitinsky, Eagleville, Conn., and Carl R. Soderberg, Weston, Mass., assignors to United Aircraft Corporation, East Hartford, Conn., a corporation of Delaware Application August 23, 1944, Serial No. 550,885

15 Claims. (Cl. 60—41)

This invention relates to a cooled turbine rotor for a turbine operating at high temperatures.

The copending application of Soderberg, Serial No. 550,899, filed August 23, 1944, now Patent No. 2,461,242, discloses a turbine rotor made up of a number of discs held together by a bolt extending centrally through the discs. The central opening in the discs increases the stress concentration in the part of the discs surrounding the opening, and the materials used in the discs lose their strength as the temperature increases even though the materials are heat resistant. An object of this invention is to cool the discs to maintain the necessary strength to permit rotation at the desired speed.

Moreover, if the discs are allowed to heat up, without corresponding heating of the bolt, the axial expansion of the discs may overload the bolt. A feature of this invention is the maintenance of approximately similar temperatures in the bolt and the surrounding discs.

The surfaces of the discs which are exposed to the hot power fluid during operation absorb heat and cause heating of the entire disc. A feature of this invention is the formation of an insulating layer of cooling air over the surfaces of the discs.

Another feature of the invention is the arrangement of the diaphragm seal to direct the cooling air over the surfaces of the discs. Another feature is the use of existing openings in the rotor between the central opening and its outside surface for the air flow.

The labyrinth seals at front or rear end of the turbine may have gas under pressure admitted between the ends of the seal, to prevent leakage of hot power fluid into the seal. A feature of this invention is a connection between the seal and the turbine rotor so that the gas under pressure for cooling the rotor may be supplied through the seal.

Other objects and advantages will be apparent from the specification and claims, and from the accompanying drawings which illustrate an embodiment of the invention.

Figure 1:
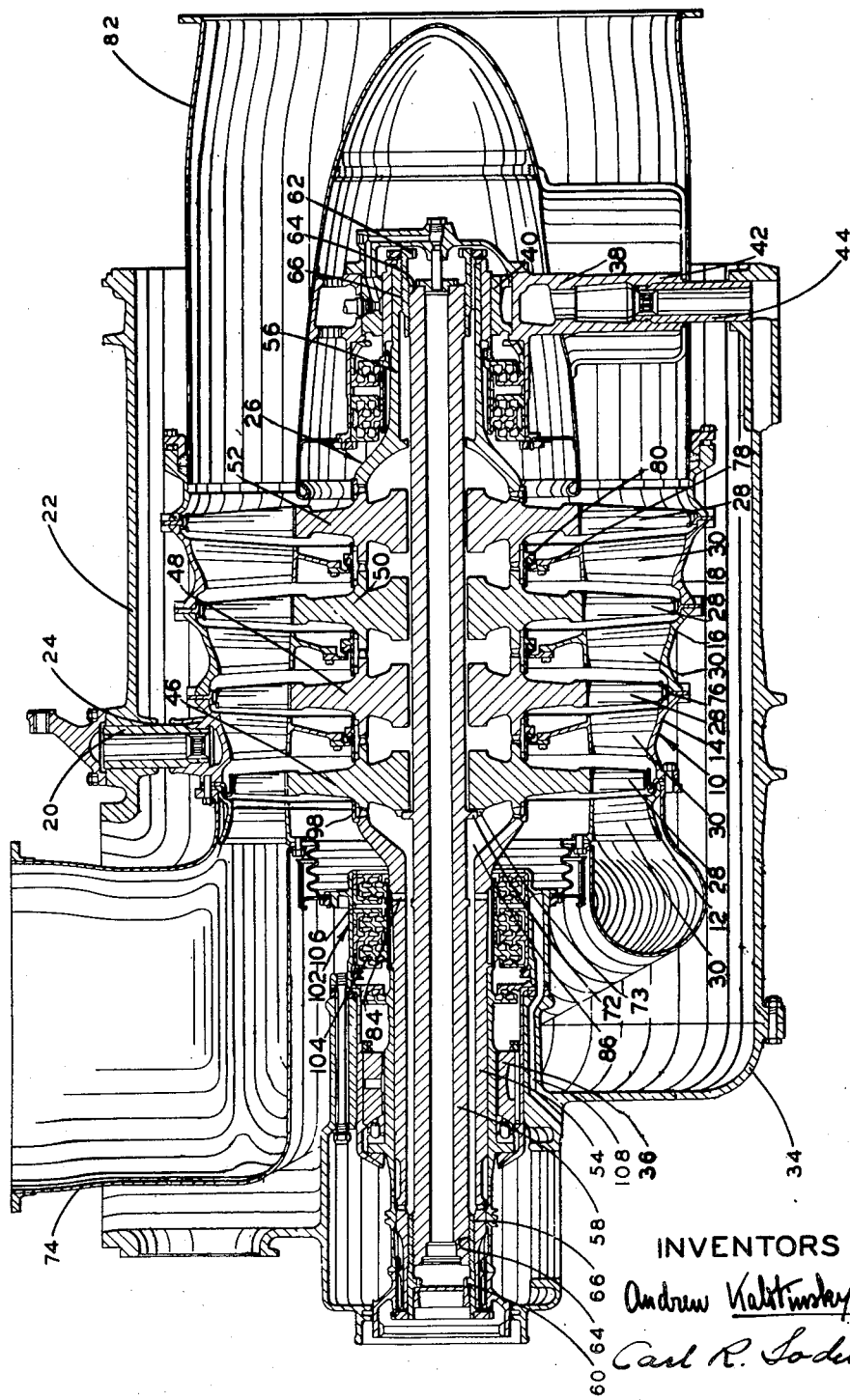
Fig. 1 is a sectional view through the turbine.

The turbine shown includes a casing 10 built up of rings 12, 14, 16 and 18 supported by radial pins 20 in a housing 22. These pins, which are all in substantially the same plane and which constitute the support for the casing within the housing, engage bores in bosses 24 in one ring 14 of the casing. Rotor 26 within the casing has a number of rows of blades 28 alternating with the rows of nozzles 30 in the casing.

Housing 22 has a head 34 which forms a part of the housing and supports a bearing sleeve 36 for the front end of rotor 26. At the other end of the turbine, the housing 22 supports a mounting 38 within which is a bearing 40 for the rotor. Mounting 38 has a number of legs 42 engaging with radial pins 44 which locate the mounting within the housing.

Rotor 26 is made up of a number of discs 46, 48, 50 and 52, and shaft-forming, end elements 54 and 56. The discs and the shaft elements are held together by a central bolt 58. The ends of the bolt are positioned within the end elements 54 and 56 and are connected to the end elements by threaded sleeves 60 and 62. Each sleeve 60, 62 has inner and outer threads 64 and 66 engaging respectively with cooperating threads on the bolt and on the end elements. On one of the sleeves (sleeve 60 as shown) the inner and outer threads may differ in pitch so that as the sleeve is screwed into place, a substantial tension may be applied to the bolt.

Since the casing is built up of casing rings bolted together, each ring having a row of nozzles, and since the rotor is built up of discs, each having a row of blades, it is apparent that the turbine is adapted for endwise assembly. To assist in aligning the discs during assembly, and to prevent relative rotation in operation, each disc has projecting annular flanges 68 and 70 on opposite sides having interengaging elements preferably in the form of the face splines or teeth 71 cooperating with similar elements on the adjoining disc. Similarly, the inner ends of shaft elements 54 and 56 have face splines or teeth cooperating with the splines 71 on the end discs. Stability of the rotor may be maintained by radial projections 72 on the central bolt engaging grooves 73 on disc 46. The teeth 71 project axially from the disks, and the elements of the surfaces of the teeth extend in radial direction.

Gas enters the first stage nozzles of the turbine through an inlet scroll 74 which is attached to the end of casing 10. Leakage of power gas past the outer ends of the blades is prevented by seals 76 which may be positioned between adjoining casing rings. Leakage of power gas past the inner edge of the diaphragm 78 extending inwardly from each row of nozzles is prevented by a labyrinth seal 80. Gas from the turbine discharges through a duct 82 connected to the end casing ring and surrounding the rear bearing mounting.

The rotor discs may be cooled by admitting gas under pressure through a passage 84 in the front end element 54 to the space 86 between this element and the first disc 46. The central openings in the discs are larger in diameter than the connecting bolt 58 and gas from space 86 passes through the central openings in the discs and around each disc, thereby reducing the temperatures of the central parts of the discs and assisting in maintaining these parts at approximately the same temperature as the connecting bolt.

A part of the cooling gas discharges past the interengaging face splines or teeth between the front end element 54 and the first disc 46 and also past the interengaging splines between adjoining discs, for cooling the surfaces of the discs. The inner element 88 of the labyrinth seal 80 covers the face splines and has a sleeve 92 which is spaced from the flanges 68 and 70 on the discs to cause a flow of cooling gas as indicated by the arrows 94 past the outer ends of the sleeves and outwardly over the surfaces of the discs. The sleeve 92 may be held out of contact with the flanges by projecting ribs 96 on the sleeve. Slots 97 in the rib permit coolant to flow past the rib. The teeth are so constructed that inter-engaging teeth do not bottom in the grooves between the teeth thus defining passages 99 for the flow of cooling gas.

A sleeve 98 is positioned over the face splines between the front end element 54 and the first disc 46 and has a substantially gas tight fit with the end element so that gas passing through the face splines underneath this sleeve is discharged over the surface of the first disc and forms an insulating layer of relatively cool gas. A similar sleeve on the rear end element 56 causes gas escaping through the underlying face splines to flow over the rearward face of the last disc 52.

A labyrinth seal 102 may be located at the intake end of the turbine to prevent leakage around the turbine shaft. This seal, which includes an inner member 104 rotating with the shaft and an outer member 106 fixed within head 34, may have gas under pressure admitted between the ends to prevent gas in the turbine from leaking through the seal. As shown, gas at a pressure higher than the pressure of the power gas enters the seal through an inlet conduit 108 in head 34 into seal member 106.

Gas under pressure for cooling the turbine rotor may be introduced through this seal to the passage 84. The outer end of member 104 is tight on the shaft, and the inner end has a substantially tight fit. Passage 84 in end element 54 communicates with a chamber 110 between the inner member 104 and element 54, and a passage 112 in member 104 admits gas from the seal to the chamber. Since the gas admitted to the seal is at a higher pressure than the power gas within the turbine, the pressure of the cooling gas within the turbine rotor will be high enough to assure a flow of gas around the rotor discs and past the face splines to flow over the surfaces of the rotor discs.

Figures 2, 4:
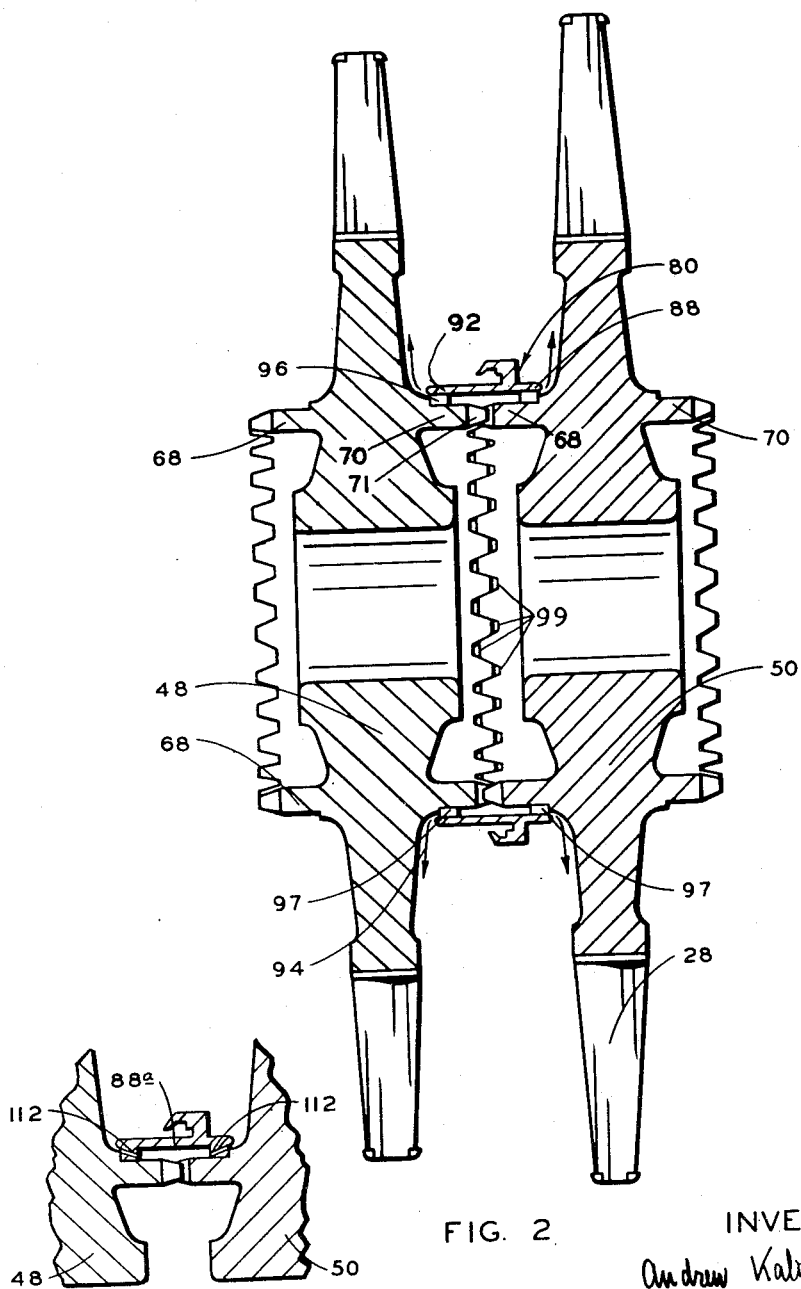
Fig. 2 is an enlarged sectional view of a part of the rotor showing the diaphragm seal.
Fig. 4 is a fragmentary sectional view of a modified form of sleeve for controlling the cooling air flow.
Figure 3:
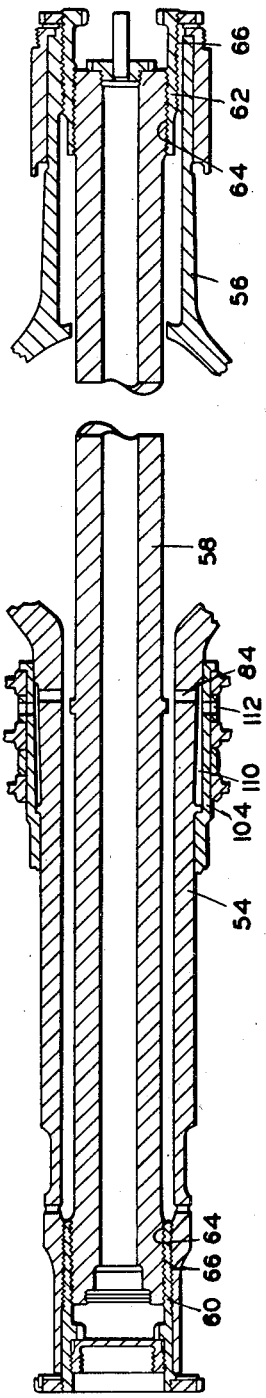
Fig. 3 is a sectional view of the rotor bolt and the front seal.

Instead of slots 97 as shown in Fig. 2, the ribs on the diaphragm sleeve 88a may have a number of small drilled passages 112, Fig. 4, spaced about the circumference to control accurately the quantity of air discharged.

It is to be understood that the invention is not limited to the specific embodiment herein illustrated and described, but may be used in other ways without departure from its spirit as defined by the following claims.

We claim:

1. A turbine rotor including a number of discs, each having a row of blades thereon, each of said discs having annular side surfaces engaging similar surfaces on adjacent discs, means for introducing gas to the interior of the rotor and passages for escape of gas between said engaging surfaces.

2. A turbine rotor including a number of discs, each having a row of blades thereon, each of said discs having annular side surfaces engaging similar surfaces on adjacent discs, a sealing element mounted on the rotor between adjoining discs radially outward of the annular side surfaces, means for introducing gas to the interior of the rotor, and passages for escape of gas radially outward past said surfaces and sealing element from within the rotor.

3. A turbine rotor including a number of discs, each having a row of blades thereon, each of said discs having teeth projecting axially and engaging similar teeth on adjacent discs, and means for introducing gas to the interior of the rotor, said teeth being constructed to provide passages at the tips of the teeth for escape of gas radially outward past said teeth from within the rotor.

4. A turbine rotor including a number of discs, each having a row of blades thereon, each of said discs having axially extending teeth engaging similar teeth on adjacent discs, said teeth being constructed to provide for a flow of cooling fluid past the tips of the teeth from within the rotor, sealing elements extending around said teeth and means on said elements for guiding the cooling fluid past said sealing elements, said sealing elements being constructed for guiding the escaping gas over the surfaces of the discs externally of the axially extending teeth.

5. A turbine rotor including a number of discs, each having a row of blades thereon, each of said discs having axially extending teeth engaging similar teeth on adjacent discs, means provided by said teeth for directing gas from within the rotor past said teeth to the space between adjacent discs, and means for admitting gas internally of the rotor at a pressure higher than the pressure of the power gas in the turbine.

6. A turbine rotor having a number of axially spaced discs, each having a row of blades on its periphery, a passage within said rotor for cooling gas, means for supplying gas to said passage, passages in the rotor extending between said first passage and the outside surface of the rotor between adjacent rows of blades for directing gas from said passage outwardly between said discs and means for directing the gas against the disc surfaces.

7. A turbine rotor including a number of axially spaced discs, each having a row of blades, a passage in said rotor for cooling gas and means in the form of small passages extending from said first passage and communicating with the outer surface of the rotor between adjacent discs for discharging gas from said passage over the outside surfaces of said discs between adjacent rows of blades, said small passages terminating in a substantially axial direction for directing the escaping gas against the side surface of the adjacent discs.

8. A turbine rotor including a number of discs, each having a row of blades, a passage in said rotor for cooling gas and means for discharging gas from said passage over the surfaces of said discs, said means including a sleeve between adjoining discs positioned for directing gas around its ends and against the outside surfaces of the disc.

9. A turbine rotor including a number of spaced discs, each having a row of blades, a passage in said rotor for cooling gas, means for discharging gas from said passage into the spaces between said discs, and a sleeve positioned between the discs for guiding the discharging gas against the surfaces of the discs.

10. A turbine rotor including a number of separate discs, a shaft element at each end of the set of discs, a central bolt extending between said elements and holding said discs together, said discs having spacing means for holding them in spaced relation and having central openings larger than the bolt through which the bolt extends to provide a space around said bolt, and means for discharging cooling gas through one of said elements and through the space between the discs and the bolt, said spacing means having passages therein communicating with the outside of the rotor for the flow of cooling gas onto the surfaces of the discs externally of the spacing means.

11. A turbine rotor including blade carrying discs having laterally projecting interengaging flanges between the blade roots and the axes of the discs for spacing the discs, said flanges providing passages for the escape of cooling air from within the rotor, and a diaphragm seal extending between the discs and supported on the external peripheral surfaces of said flanges, said seal having passages for the escape of the cooling air outwardly from within the rotor.

12. A turbine rotor including blade carrying discs having laterally projecting interengaging flanges between the blade roots and the axes of the discs for spacing the discs, said flanges providing passages for the escape of cooling air from within the rotor, and a diaphragm seal supported on the external peripheral surfaces of said flanges, said seal having passages for the escape of cooling air outwardly from within the rotor, said seal and passages being arranged to guide the cooling air against the surfaces of the discs.

13. A turbine rotor including blade carrying discs, a seal in the form of a ring extending between and engaging adjacent discs, and axially extending projections on the discs between the blade roots and the disc axis for supporting the seal, said seal being mounted on the outer peripheral surfaces of the projections and having passages therethrough and arranged in such a direction as to direct air escaping through said passages from within the rotor against the side surfaces of the discs externally of the projections.

14. A turbine rotor including blade carrying discs having laterally projecting flanges located radially between the blade roots and the axes of the discs, and a ring supported by the outer peripheral surfaces of said flanges, said ring having passages for the escape of cooling air from within the rotor, said ring and passages being arranged to guide the cooling air against the surfaces of the discs radially outwardly of the flanges and ring.

15. A turbine rotor including blade carrying discs, a ring extending between and engaging adjacent discs, and axially extending projections on the disc between the blade roots and the axes of the discs for supporting the ring, said ring being mounted on the outer peripheral surfaces of the flanges and having passages therein arranged in such a direction as to direct air escaping through said passages from within the rotor against the side surfaces of the discs externally of said flanges and ring.

ANDREW KALITINSKY.
CARL R. SODERBERG.

REFERENCES CITED

The following references are of record in the file of this patent:

UNITED STATES PATENTS

| Number | Name | Date |
|---|---|---|
| 1,421,087 | Johnson | June 27, 1922 |
| 1,653,217 | Koch | Dec. 20, 1927 |
| 2,073,605 | Belluzo | Mar. 16, 1937 |
| 2,213,940 | Jendrassik | Sept. 3, 1940 |
| 2,241,782 | Jendrassik | May 13, 1941 |
| 2,243,467 | Jendrassik | May 27, 1941 |
| 2,339,779 | Holzwarth | Jan. 25, 1944 |

FOREIGN PATENTS

| Number | Country | Date |
|---|---|---|
| 340,421 | Great Britain | Jan. 1, 1931 |